(12) United States Patent
Tame et al.

(10) Patent No.: US 7,040,684 B2
(45) Date of Patent: May 9, 2006

(54) EASY ENTRY SEAT WITH SEAT BACK MOUNTED FLOOR LATCH

(75) Inventors: Omar D. Tame, West Bloomfield, MI (US); Alexander Victor Kaytser, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 31 days.

(21) Appl. No.: 10/479,259

(22) PCT Filed: May 29, 2002

(86) PCT No.: PCT/US02/16659

§ 371 (c)(1),
(2), (4) Date: Aug. 2, 2004

(87) PCT Pub. No.: WO02/096699

PCT Pub. Date: Dec. 5, 2002

(65) Prior Publication Data

US 2004/0251705 A1    Dec. 16, 2004

Related U.S. Application Data

(60) Provisional application No. 60/294,131, filed on May 29, 2001.

(51) Int. Cl.
*B60N 2/10* (2006.01)
*B60N 2/20* (2006.01)
*B60N 2/235* (2006.01)
*B60N 2/36* (2006.01)

(52) U.S. Cl. .............. 296/65.09; 296/65.16; 296/65.01; 297/331; 297/336; 297/378.12

(58) Field of Classification Search .......... 296/63, 296/65.01, 65.05, 65.09, 65.16, 69; 297/335, 297/336, 331, 378.12, 334
See application file for complete search history.

(56) References Cited

U.S. PATENT DOCUMENTS 3,756,655 A    9/1973   Perkins (Continued)

FOREIGN PATENT DOCUMENTS

DE    19943537 A1 *    3/2001

(Continued)

*Primary Examiner*—Patricia L. Engle
(74) *Attorney, Agent, or Firm*—Clark Hill PLC

(57) ABSTRACT

A seat assembly for use in an automotive vehicle comprises a seat cushion and a seat back pivotally connected to the seat cushion by a recliner mechanism for providing pivotal movement of the seat back between a plurality of reclined seating positions and a forwardly folded position against the seat cushion. A front link supports the seat cushion above the floor of the vehicle in the seating position and lowers the seat cushion to a flat position with the seat back in the folded position. A rear floor latch releasably secures the seat cushion to the floor of the vehicle in the seating position and unlocks the seat cushion and the seat back for pivotal movement about the front link from the seating position to an upright tilted position with each of the seat cushion and the seat back extending generally upright from the floor of the vehicle. A rear link is operatively coupled between the seat back and the floor of the vehicle for supporting and securing the seat cushion and the seat back in the tilted position.

11 Claims, 4 Drawing Sheets

U.S. PATENT DOCUMENTS

| | | |
|---|---|---|
| 4,736,985 A | 4/1988 | Fourrey et al. |
| 4,925,228 A | 5/1990 | Pipin et al. |
| 6,024,411 A | 2/2000 | Pesta et al. |
| 6,135,555 A | 10/2000 | Liu et al. |
| 6,139,105 A | 10/2000 | Morgos et al. |
| 6,152,533 A | 11/2000 | Smuk |
| 6,196,610 B1 | 3/2001 | Pesta et al. |
| 6,196,613 B1 | 3/2001 | Arai |
| 6,227,619 B1 | 5/2001 | Pesta et al. |
| 6,231,101 B1 | 5/2001 | Kamida et al. |
| 6,234,574 B1 | 5/2001 | Hoshihara et al. |
| 6,283,550 B1 | 9/2001 | Vialatte et al. |
| 2001/0001526 A1 | 5/2001 | Moon et al. |
| 2001/0050502 A1 | 12/2001 | Fourrey et al. |

FOREIGN PATENT DOCUMENTS

| | | |
|---|---|---|
| EP | 0738624 A1 * | 10/1996 |
| FR | 585455 A * | 3/1925 |
| WO | WO 00/03892 A2 * | 1/2000 |

* cited by examiner

EASY ENTRY SEAT WITH SEAT BACK MOUNTED FLOOR LATCH

This application claims the benefit of Provisional Application Ser. No. 60/294,131, filed May 29, 2001.

BACKGROUND OF THE INVENTION

1. Field of Invention

The subject invention relates to a seat assembly for an automotive vehicle, and more particularly, to a fold and tilt mechanism operatively coupled between a seat back and a seat cushion of the seat assembly for moving the seat assembly between a seating position, a folded position with the seat back pivoted against the seat cushion and an upright tilted position with the seat cushion pivoted forwardly and generally upright and the seat back pivoted about the seat cushion to an upright position.

2. Description of the Related Art

Automotive vehicles include seat assemblies for supporting occupants within the vehicle cabin. Seat assemblies include a generally horizontal seat cushion and a generally upright seat back for supporting the back of an occupant seated upon the seat cushion. Typically, a recliner assembly is operatively coupled between the seat cushion and the seat back for allowing selectively lockable and pivotal adjustment of the seat back relative to the seat cushion between a plurality of reclined seating positions and a folded position forwardly overlying the seat cushion.

Seat assemblies also commonly include a floor latch mechanism or riser assembly that allow the seat assembly to be latched or removed from the vehicle. Additionally, the riser assembly may provide pivotal movement of the seat assembly between a seating position and a forwardly tumbled position with the seat back in the folded position against the seat cushion and the seat cushion tilted in a generally upright position to provide additional storage space behind the seat assembly within the vehicle. An example of such a riser assembly is disclosed in U.S. Pat. No. 6,227,619B1, which issued to Pesta et al. on May 8, 2001. However, such riser assemblies require space to accommodate the motion of the seat assembly between the seating and forwardly stowed positions while the seat back is in the folded position against the seat cushion.

It remains desirable to provide a seat assembly that is movable between the seating position and a stowed position that minimizes the space required to accommodate the pivotal movement of the seat assembly between the seating and stowed positions. It remains further desirable to provide a simple lock or latch mechanism that allows selective latching of the seat assembly to the vehicle while in the seating position.

SUMMARY OF THE INVENTION

According to one aspect of the invention there is provided a seat assembly for use in an automotive vehicle. The seat assembly comprises a seat cushion and a seat back pivotally assembled to the seat cushion for movement between a plurality of reclined seating positions including a fully reclined seating position relative to the seat cushion. A recliner mechanism is operatively coupled between the seat cushion and the seat back for selectively locking the seat back between any one of the plurality of reclined seating positions. A front link extends between one end pivotally coupled to the seat cushion and an opposite end pivotally coupled to the floor of the vehicle for supporting the seat cushion in a seating position above the floor of the vehicle and for guiding the seat cushion between the seat position and a flat position against the floor of the vehicle. The seat assembly includes a rear floor latch for releasably locking the seat cushion in the seating position to a striker bar fixedly secured to the floor of the vehicle and unlocking the seat cushion and the seat back for movement between the seating position and an upright position with both of the seat cushion and seat back extending generally upright from the floor of the vehicle. A rear support link is operatively coupled between the seat assembly and the floor of the vehicle for supporting and securing the seat cushion and the seat back in the upright position and for guiding the seat assembly between the seating and upright positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
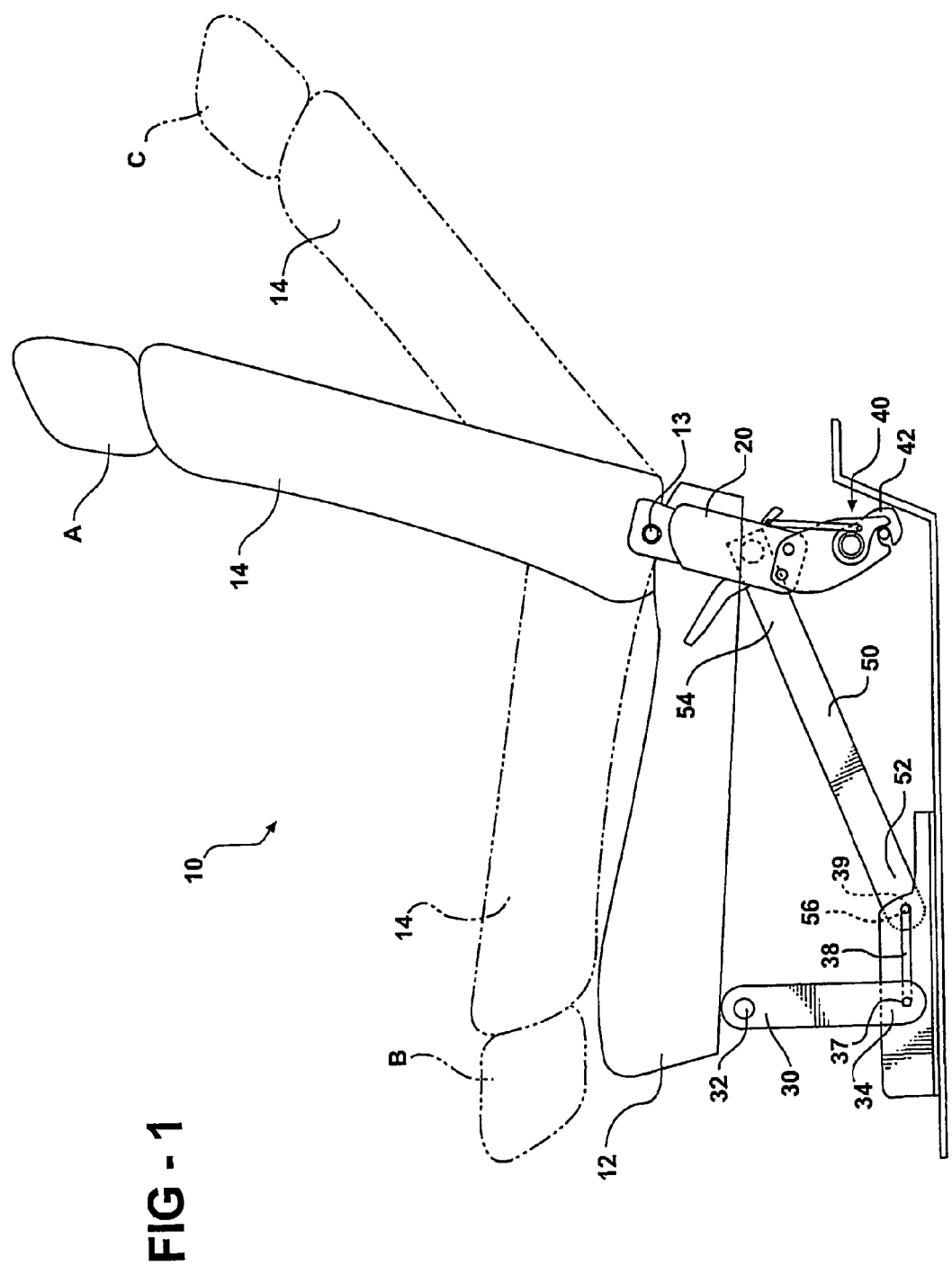
FIG. 1 is a side view of a seat assembly according to an embodiment of the invention.
Figure 2:
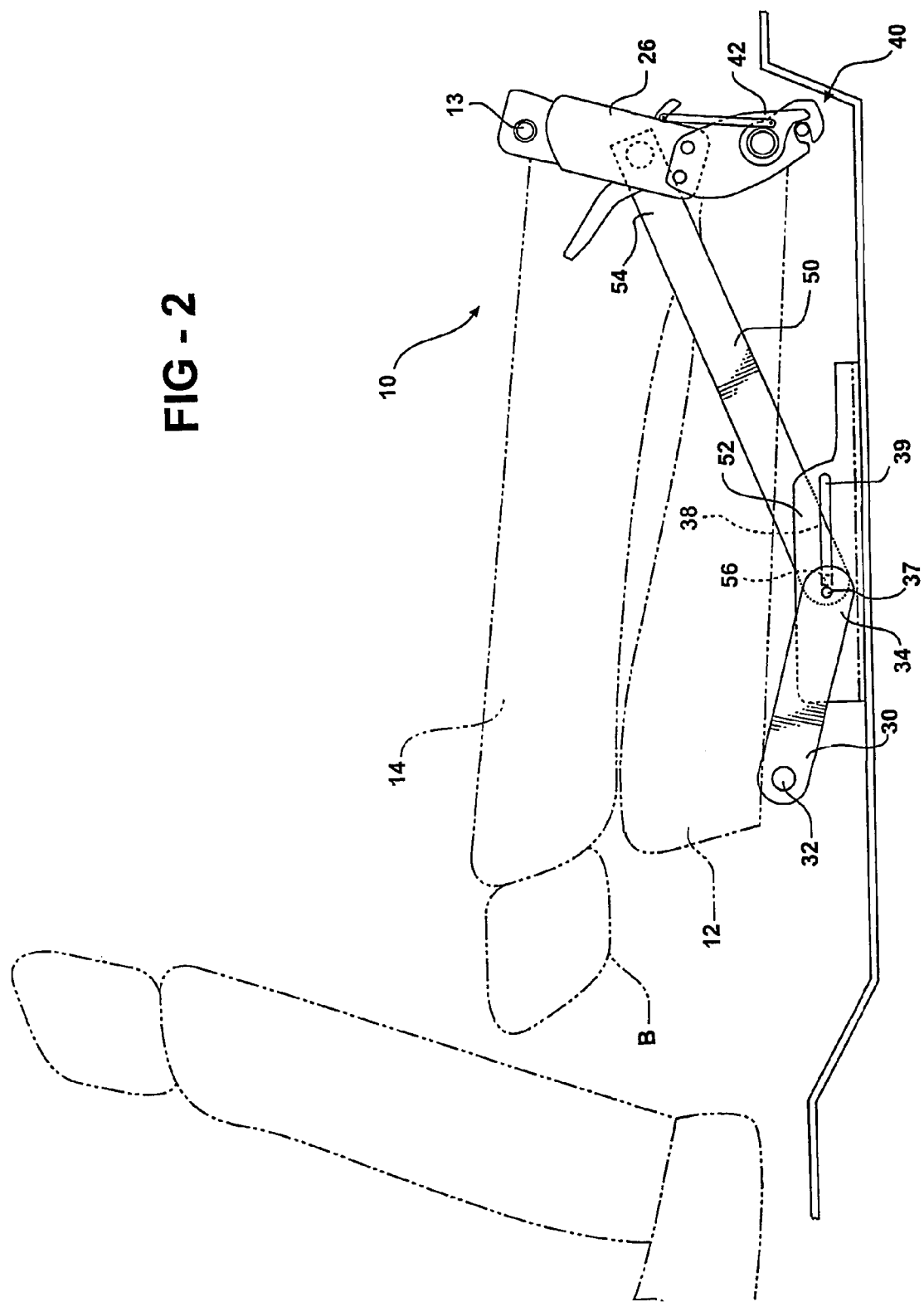
FIG. 2 is a side view of the seat assembly in a folded flat position with the seat back in a forwardly folded position overlying the seat cushion.
Figure 3:
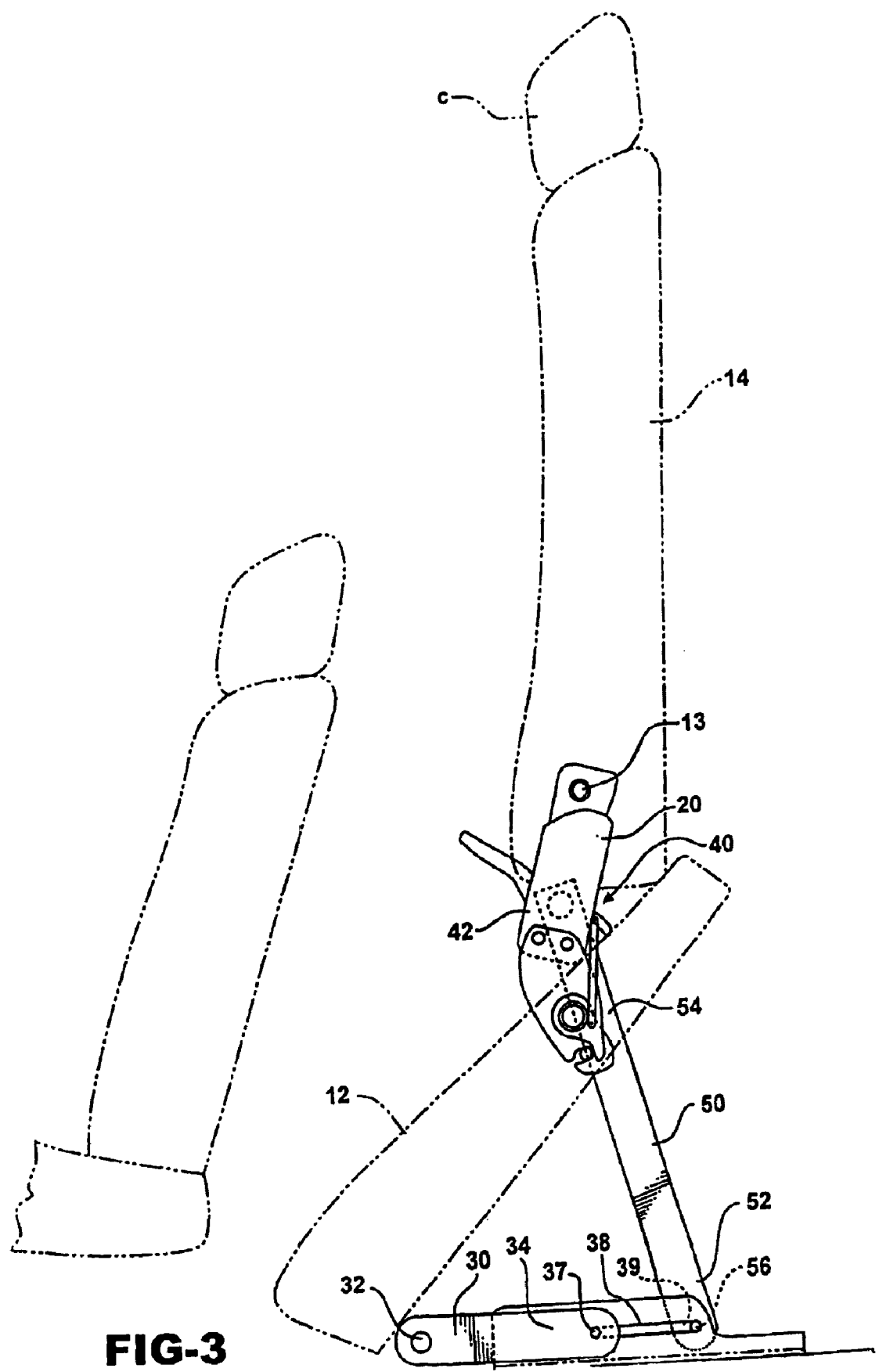
FIG. 3 is a side view of the seat assembly in a forwardly tumbled position.

Referring to FIGS. 1–3, a seat assembly 10 is shown for supporting an occupant above a floor 16 of an automotive vehicle. The seat assembly 10 includes a seat cushion 12 and a seat back 14 pivotally coupled to the seat cushion 12 by a pivot pin 13 for pivotal movement of the seat back 14 about the pivot pin 13 relative to the seat cushion. As shown in FIG. 1, a recliner assembly 20 is operatively coupled between the seat cushion12 and the seat back 14 for allowing selective locking and pivotal adjustment of the seat back 14 relative to the seat cushion 12 between a generally upright seating position A, a forwardly folded position B generally overlying the seat cushion 12, and a fully reclined seating position C.

Figure 4:
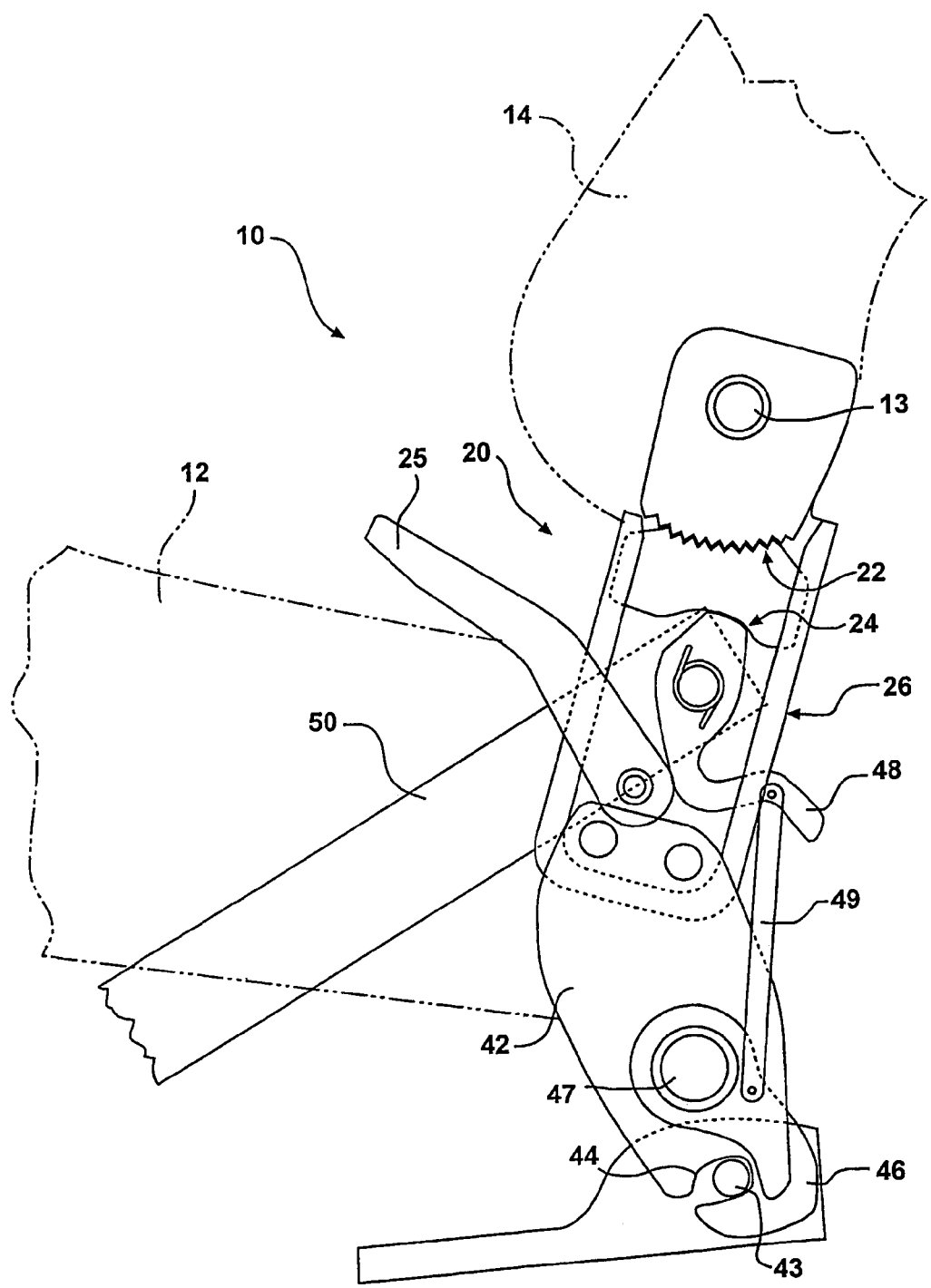
FIG. 4 is a partially enlarged view of an easy entry seat back mounted floor latch according to an embodiment of the invention.

Referring to FIG. 4, the recliner mechanism 20 includes a sector of teeth 22 formed in a bracket 24 fixedly secured to the seat back 14. The sector of teeth 22 are generally centered about the pivot pin 13. A pawl 24 having a rack of teeth lockably engagable with the sector of teeth 22 is slidably coupled to a support bracket 26 fixedly secured to the seat cushion 12 for sliding movement in and out of locking engagement with the sector of teeth 22. While engaged with the sector of teeth 22, the pawl 24 prevents pivotal movement of the seat back 14 relative to the seat cushion 12. With the pawl 24 disengaged from the sector of teeth 22, the seat back 14 is freely pivotable about the pivot pin 13. The pawl 24 is biased toward locking engagement with the sector of teeth 22 by a clock spring or other suitable biasing member. A release handle 25 is pivotally coupled to the support bracket 26 for manual camming actuation of the pawl between engagement and disengagement with the sector of teeth 22. Further details and operation of the recliner mechanism are fully set forth in Patent Cooperation Treaty Patent Application PCT/US02/02830 filed Feb. 1, 2002, which is incorporated herein by reference in its entirety.

Referring to FIGS. 1–3, a front link 30 extends between one end 32 pivotally coupled to the front portion of the seat cushion 12 and an opposite end 34 pivotally coupled to a riser bracket 36 fixedly secured to the floor 16. The front link 30 supports the front portion of the seat cushion 12 in a seating position spaced above the floor 16, as shown in FIG. 1. The front link 30 allows movement of the front portion of the seat cushion 12 between the seating position, as shown in FIG. 1, and a folded flat position lying against the floor 16, as shown in FIG. 2.

A rear floor latch 40 extends downwardly from the rear portion of the seat cushion 12 for selectively locking the rear portion of the seat cushion 12 in the seating position to a striker bar 43 fixedly secured to the floor 16, as shown in FIGS. 1, 2 and 4. The rear floor latch 40 includes a latch foot 42 fixedly secured to the support bracket 26. The latch foot 42 includes a U-shaped hook portion 44 for locating the rear floor latch 40 against the striker bar 43. A latch hook 46 is pivotally coupled to the latch foot 42 adjacent the hook portion 44 for movement between locked and unlocked positions. In the locked position, the striker bar 43 is lockingly retained between the hook portion 44 of the latch foot 42 and the latch hook 46. With the latch hook 46 in the unlocked position, the hook portion 44 is movable in and out of engagement with the striker bar 43. A biasing member 47 of any suitable type, such as a clock spring, biases the latch hook 46 towards the locked position. A rear release lever 48 is pivotally coupled to said support bracket 26 for camming actuation of said pawl in and out locking engagement with the sector of teeth 22. A link 49 extends between the rear release lever 48 and the latch hook 46 for simultaneously moving the pawl 24 in and out of locking engagement with the sector of teeth 22 and the latch hook 46 between the locked and unlocked positions, respectively.

A rear support link 50 extends between a first end 52 pivotally and slidably coupled with the riser bracket 36 and a second end 54 pivotally coupled to the support bracket 28 between the pivot pin 13 and the rear floor latch 40. More specifically, a slot 38 is formed in the riser bracket 36 extending between opposite front and back ends 37, 39. A pin 56 extends through both the first end 52 of the rear support link 50 and the slot 38 for allowing pivotal movement and forward and rearward movement of the first end 52 along the slot 38. Forward and rearward movement of the first end 52 is limited by engagement of the pin 56 with the front and back ends 37, 39 of the slot 38, respectively.

In operation, an occupant may sit on the seat assembly 10 in the seating position. In the seating position, the front of the seat cushion 12 is supported spaced above the floor 16 by the front link 30, as shown in FIG. 1. The latch hook 46 is in the locked position with the striker bar 43 retained between the latch hook 46 and the hook portion 44 for locking the seat cushion 12 in the seating position. The occupant may adjust the angular position of the seat back 14 by disengaging the pawl 24 from the sector of teeth 22 by rotating the release handle 25 in the clockwise direction, as viewed in the figures. The seat back 14 is then pivotally movable between the seating position A, the fully reclined seating position C, and a plurality of reclined seating positions therebetween. The seat back 14 may be locked in any one of the reclined seating positions as desired by allowing the pawl 24 to reengage the sector of teeth 22.

Alternatively, with the pawl 24 disengaged from the sector of teeth 22, the seat back 14 may be moved between any one of the reclined seating positions and the forwardly folded position B to present the back of the seat back 14 as a cargo loading floor.

With the seat back 14 in the forwardly folded position B, the latch hook 46 maybe may be moved to the unlocked position to allow movement of the seat cushion 12 and the seat assembly 10 between the seating position, as shown in FIG. 1, and the folded flat position lying against the floor 16, as shown in FIG. 2. The front of the seat cushion 12 is pivotally guided by the front link 30 from the seating position to the folded flat position. The rear of the seat cushion 12 is supported by the rear support link 50. The rear support link 50 pivots and slides forwardly along the slot 38 to guide the rear of the seat cushion 12 and the seat assembly 10 to the folded flat position. Guided by the front and rear support links 40, 50, the seat assembly 10 may be moved between the folded flat position and the seating position until when in the seating position the hook portion 44 locates against the striker bar 43 and the latch hook 46 returns to the locked position under the force of the biasing member 47.

With the seat back 14 in the fully reclined seating position C and the latch hook 46 in the unlocked position, the seat assembly 10 is freely movable between the seating position, as shown in FIG. 1, and an upright tilted position, as shown in FIG. 3. As the seat assembly 10 is moved forwardly towards the upright tilted position, the seat cushion 12, seat assembly 10 and the front link 30 are tilted in the counterclockwise direction, as viewed in the figures, until the seat cushion and back 12, 14 extend generally vertically from the floor 16 and the front link 30 is generally flat against the floor 16. The rear support link 50 pivots counterclockwise about the back end 39 of the slot 38 to support the seat assembly 10 in the upright tilted position. Guided by the front and rear support links 40, 50, the seat assembly 10 is freely movable between the upright seating position and the seating position until when in the seating position the hook portion 44 locates against the striker bar 43 and the latch hook 46 returns to the locked position under the force of the biasing member 47.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly for use in an automotive vehicle comprising:

a seat cushion;

a seat back pivotally assembled to the seat cushion for movement between a plurality of reclined seating positions including a fully reclined seating position relative to said cushion;

a recliner mechanism operatively coupled between said seat cushion and seat back for selectively locking said seat back between any one of said plurality of reclined seating positions;

a front link extending between one end pivotally coupled to said seat cushion and an opposite end pivotally coupled to the floor of the vehicle for supporting said seat cushion in a seating position above the floor of the vehicle and for guiding said seat cushion between said seating position and a flat position lying against the floor of the vehicle;

a rear floor latch for releasably locking said seat cushion in said seating position to a striker bar fixedly secured to the floor of the vehicle and unlocking said seat cushion and said seat back for movement between said seating position and an upright position with both of said seat cushion and seat back extending generally upright from the floor of the vehicle; and a rear support link operatively coupled between said seat assembly and the floor of the vehicle for supporting and securing said seat cushion and said seat back in said upright position and for guiding said seat assembly between said seating and upright positions.

2. A seat assembly as set forth in claim 1 wherein said rear floor latch includes a latch foot having a hook portion engagable with the striker bar in the floor of the vehicle for locating and retaining said seat assembly in said seating position.

3. A seat assembly as set forth in claim 2 wherein said rear floor latch includes a latch hook pivotally coupled to said latch foot for movement between a locked position for lockably retaining the striker bar between said latch hook and said hook portion of said latch foot and an unlocked position allowing movement of said hook portion in and out of engagement with the striker bar.

4. A seat assembly as set forth in claim 3 including a biasing member for biasing said latch hook towards said locked position.

5. A seat assembly as set forth in claim 4 including a rear release handle operatively coupled between said recliner mechanism and said rear floor latch for manually locking and unlocking both said recliner mechanism and said rear floor latch.

6. A seat assembly as set forth in claim 5 including a link extending between said rear release handle and said latch hook for simultaneously unlocking and locking said recliner mechanism and said latch hook.

7. A seat assembly as set forth in claim 6 including a riser bracket fixedly secured to the floor of the vehicle for pivotally supporting said front link for movement of said seat cushion between said seating and flat positions, said riser bracket including a slot for slidably and pivotally supporting said rear support link during movement of said seat assembly between said seating, flat and upright positions.

8. A seat assembly as set forth in claim 7 including a pin extending through both said rear support link and said slot of said riser bracket for sliding and pivotal movement of said rear support link about said slot.

9. A seat assembly as set forth in claim 8 wherein said recliner mechanism includes a bracket having a sector of teeth and a pawl movable in and out of locking engagement with said sector of teeth for selectively locking said seat back between any one of said reclined seating positions.

10. A seat assembly as set forth in claim 9 including a link extending between said rear release handle and said latch hook for simultaneously moving said pawl in and out of locking engagement with said sector of teeth and said latch hook between said locked and unlocked positions, respectively.

11. A seat assembly as set forth in claim 10 wherein said recliner mechanism includes a biasing member for biasing said pawl towards locking engagement with said sector of teeth.

\* \* \* \* \*